United States Patent Office 3,408,516
Patented Oct. 29, 1968

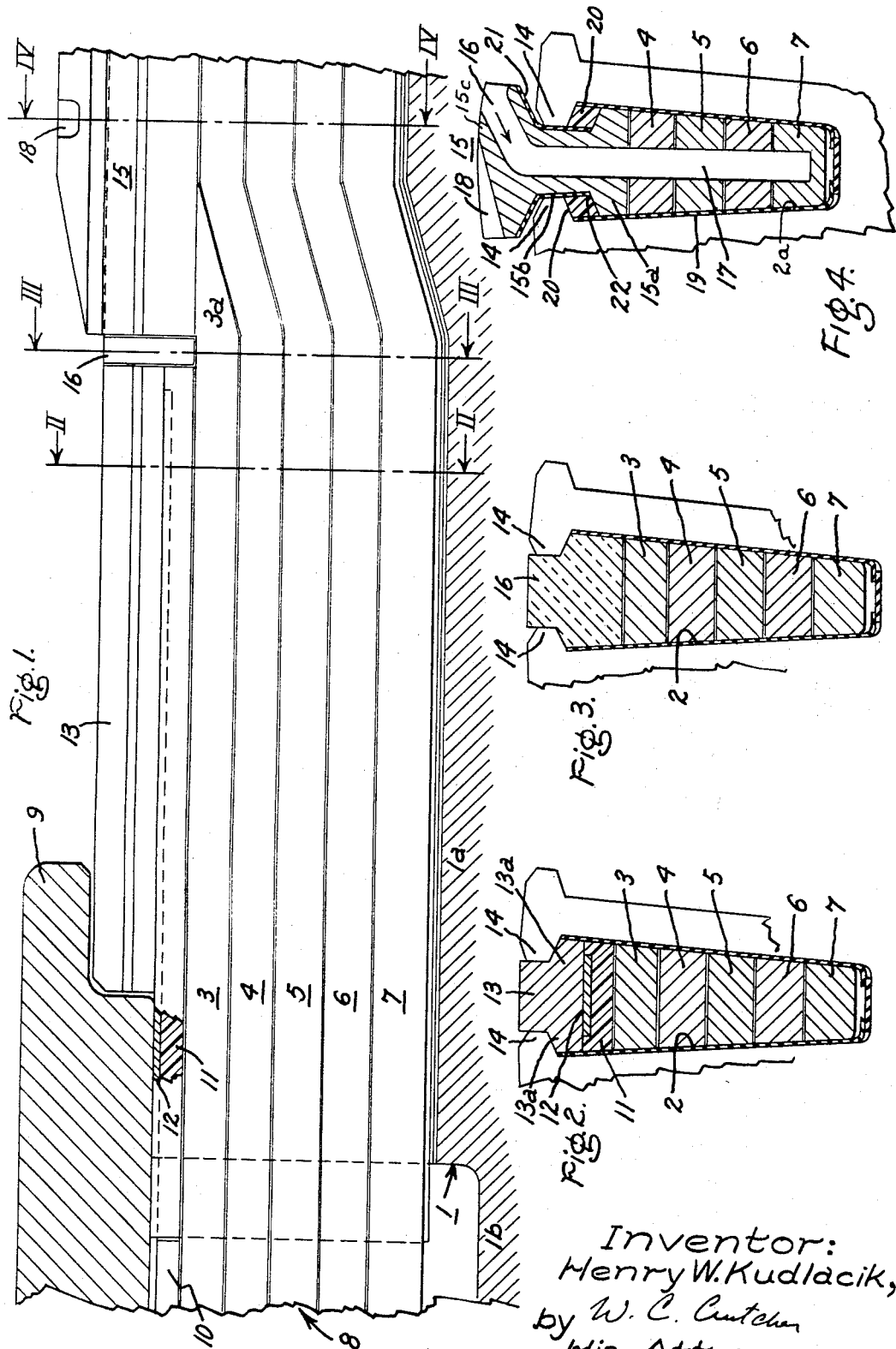

3,408,516
DYNAMOELECTRIC MACHINE ROTOR WITH CURRENT CARRYING ROTOR WEDGES
Henry W. Kudlacik, Scotia, N.Y., assignor to General Electric Company, a corporation of New York
Filed Feb. 7, 1966, Ser. No. 525,768
7 Claims. (Cl. 310—195)

ABSTRACT OF THE DISCLOSURE

A dynamoelectric machine rotor with current carrying wedges extending beyond the periphery of the rotor that serve as top conductors of the winding and hold the remaining conductors in the place in the rotor slots.

---

This invention relates generally to an improved construction for dynamoelectric machine rotor windings and more particularly to rotor windings, wherein the members which hold the windings in the slot carry electrical current along with the remainder of the winding.

The ratings of very large dynamoelectric machines, such as turbine-generators of the type wherein the rotor is wound with a DC field winding disposed in longitudinal circumferentially spaced slots depends, in part, upon the current which can be carried by the field winding. Since the outer diameter of the rotor is limited by stress considerations and since, under present construction, the windings are held in place by steel wedges which contribute nothing to the electrical capability of the generator, the space available in the slots for active copper conductors is limited.

One approach to this problem has been to employ higher current densities in the conductors, while at the same time cooling the conductors with a fluid coolant to limit the temperature rise to an acceptable level. However, even with conductor cooling, there is an ever increasing need to devise better ways to carry increased current in the field winding. While deeper slots would enable more copper to be carried in the slot, unduly deep slots will reduce the magnetic flux which the rotor core can carry, or cause unduly high flux density.

Accordingly, it is one object of the present invention to provide an improved dynamoelectric machine rotor winding, wherein the member holding the conductors in the slots along the central part of the rotor is also an active part of the winding.

Another object of the invention is to provide an improved rotor winding construction with a current-carrying wedge, which still utilizes relatively shallow slots along the central part of the rotor body.

Still another object of the invention is to provide an improved dynamoelectric machine rotor winding which increases the active conductor material in the winding and which also provides improved cooling means for the conductors.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is an elevation drawing, partly in section, taken along a winding slot, showing the transition between the windings in the rotor slots and the rotor end turns beneath the retaining ring, and FIGS. 2, 3 and 4 are transverse cross sections through the rotor slot taken along lines II—II, III—III, and IV—IV respectively.

Briefly stated, the invention is practiced by causing the rotor slots through the major central portion of the rotor body to become shallower so that the conductors occupy a more radially outward position. The top conductor in the slot near each end is terminated and attached to a current-carrying wedge member which also holds the remainder of the copper conductors in the slot along the central body portion. The current-carrying wedge member preferably extends above the rotor body periphery and becomes wider so as to extend the active current carrying area as well as to provide an improved facility for introducing gaseous coolant to the winding. In addition, the extension of the current-carrying wedge above the rotor periphery provides excellent cooling for the wedge itself.

Referring now to FIG. 1 of the drawing, a dynamoelectric machine rotor 1 includes a central body portion 1a having spindle portions 1b of lesser diameter on either end (only one end showing). Rotor 1 is mounted to rotate within the cylindrical bore of a stationary armature (not shown). Body portion 1a has a number of longitudinal circumferentially spaced slots such as 2 (FIG. 2) in which are disposed radially stacked copper conductors 3–7 inclusive. Conductors 3–7 are the coil sides of series-connected coils wound progressively from a pair of slots on either side of the rotor pole, to the next outlining pair of slots, etc. as will be understood. The end turns of the conductors, indicated at 8 and extending beyond the rotor body portion 1a, are held in place by a retaining ring 9 and insulated therefrom by insulation 10 and a creepage block 11 of insulating material. An amortisseur strip 12 may be employed, as is sometimes customary.

In the body portion of the rotor, near each end, as seen in FIG. 2, steel wedges 13 having dovetail portions 13a cooperating with projections 14 on the tips of the rotor teeth serve to hold conductors 3–7 in the slot 2 in the usual manner. Slot 2, at this point is of full depth, so as to accommodate conductors 3–7, creepage block 11, amortisseur 12 and wedge 13.

In accordance with the invention, the major portion of rotor body 1a utilizes shallower slots and a current-carrying wedge as indicated by the cross-section of FIG. 4. Here it will be seen that the slot, designated 2a, is shallower by approximately one conductor thickness. This is accomplished by gradually sloping the bottom of the slot, as indicated in FIG. 1, so that each conductor moves radially outward by approximately one conductor thickness.

In lieu of the top turn in the slot under the conventional arrangement, an aluminum current-conducting wedge member 15 serves as a substitute for the top turn. The top turn 3 gradually decreases in thickness as indicated at 3a and is electrically connected to the bottom of wedge member 15, such as by cold welding or some other suitable method.

In order to insulate current carrying wedge 15 from the adjacent steel wedge 13 which is in contact with rotor body 1a and thus at ground potential, a short insulating glass wedge member 16, preferably of reinforced glass, is employed. A cross section through the slot in the vicinity of the glass wedge is indicated in FIG. 3.

Referring to FIG. 4 of the drawing, it will be seen that the current-carrying wedge member 15 is constructed generally in the shape of an H cross-section, having a dovetail portion 15a in the slot, a narrow neck portion 15b passing between the rotor tooth projections 14, and an enlarged portion 15c extending both circumferentially and radially outward beyond the periphery of the rotor body.

The cooling facility for the winding may be any of several known types, but as shown here, consists of a gap-pickup type arranged to pump coolant gas such as hydrogen from the air gap. To accomplish this, the current-carrying wedge 15 is arranged with a number of longitudinally spaced contoured gas inlet holes 16 which connect with holes 17 in the slot conductors to form a path for the cooling gas. Additional grooves, such as 18, may be provided to guide the gas into a similar set of inlet holes on the next adjacent member 15 (not shown). The cooling pattern employed in the slot is immaterial, but could be of the diagonal flow type as shown in U.S. Patent 2,986,664 issued to D. M. Willyoung et al. on May 30, 1961. Also, although member 15 is shown with inlet ports, it will be apparent that outlet ports would be constructed in a similar manner, and normally groups of inlet and outlet ports would alternate along the wedge 15. Contouring of the gas passages is greatly facilitated by the enlarged cross section of the wedge at 15c due to its radial and circumferential projection into the air gap.

Since wedge member 15 is a current-carrying member, suitable means are employed to insulate it from the rotor body 1a. In addition to the usual slot side insulation indicated at 19, insulating creepage strips 20 are disposed along the slot between rotor tooth projections 14 and dovetail portions 15A to provide creepage distance. Creepage strips 20 must be able to carry the compressive load exerted by the windings in the slot and a suitable material consists of laminated glass cloth bonded with a polyester or epoxy resin.

In order to insulate the sides of wedge member 15 from the rotor teeth, insulating strips 21 (which may be of the same material as slot insulation strips 19) are attached to the wedge as shown with adhesive. A suitable insulating coating, such as sprayed-on aluminum oxide, having the porous spaces filled with resin, may be employed in lieu of insulating strip 21.

Although the construction of the improved winding is only shown at one end of one slot, it is the same at each end of every slot. Member 15 can be considered merely a substituting for the top turn 3 along the main body of the rotor.

Since the wedge member 15 extends substantially into the air gap, the slot can be made much shallower through the central part of the rotor body so that the rotor core is enabled to carry higher flux with no increase in flux density. Also the additional area of the member 15 in cross section, due to use of the H shape shown, allows the current carrying capability of the aluminum load-bearing member to be equivalent to that of a smaller copper member without exceeding permissible stress or temperature levels.

Although the invention is not restricted to the use of aluminum wedges, aluminum is a preferred material, since it combines high electrical conductivity and relatively high strength with light weight, and is felt to be quite suitable for the invention. It has been found that the dovetail angle along portion 15a as indicated at 22 is an important factor in determining the compressive stress that the insulating creepage strips 20 can carry without failure. Insulating creepage strips 20 have been loaded up to 93,000 p.s.i. without failing when a 45° angle along surface 22 was used.

In operation, wedge member 15 permits the use of shallower slots or increases the current-carrying capability of the rotor winding. By extending the winding itself out beyond the rotor periphery, one is able to increase the amount of active conductor material without exceeding present stress limits on the rotor material itself which act as a present limitation on rotor diameter. The enlarged section extending into the air gap makes it relatively easy to provide smoothly contoured inlet and outlet passages necessary for the conductor cooling gas. In addition, the enlarged section extending into the gap provided a very effective method of cooling the current carrying wedge.

Although the preferred arrangement shown in the drawings employs a steel wedge member in the ends of the slot to retain the conductors in place before the transition to the current-carrying wedge commences, it is also in the purview of the present invention to allow the end of the retaining ring to perform this function. In other words the current-carrying wedge can extend up to the retaining ring and be insulated therefrom, and the retaining ring will hold the conductors in the slot immediately adjacent the current-carrying wedge.

While there has been shown herein what is considered to be the preferred embodiment of the invention, other modifications will occur to those skilled in the art. It is intended to cover by the appended claims all such modifications as fall within the true spirit and scope of the invention.

What I claim as new and desire to secure by Letters Patent of the United States is:

1. In a dynamoelectric machine rotor having a rotor body defining a plurality of longitudinal circumferentially spaced dovetail slots and having a plurality of series-connected conductors disposed in said slots to provide a winding, the combination of:
   a first conductor portion forming part of said winding and disposed in top of said slot near one end of the rotor body,
   first retaining means disposed radially outward of said first conductor portion and insulated therefrom and arranged and constructed to retain the conductor portion in place,
   a current-carrying wedge member disposed in said slot and extending substantially along the entire length of the rotor body and insulated both from the rotor body and from said retaining means, said member having dovetail portions cooperating with the slot dovetails to hold it and underlying conductors in place and being electrically connected to said first conductor portion.

2. The combination according to claim 1, wherein a second conductor portion is disposed in the slot at the other end of the rotor body and held in place by second retaining means and insulated therefrom, said second conductor portion being electrically connected to the other end of said current-carrying wedge member so as to form a continuation of the winding.

3. The combination according to claim 1, wherein said retaining means comprises a second wedge member having dovetail portions cooperating with the slot dovetails to hold the first conductor portion and underlying slot conductors in place and wherein said second wedge member is insulated from the current-carrying wedge member by a third wedge member of insulating material having similar dovetail portions.

4. The combination according to claim 1, wherein the cross section of said current-carrying wedge member is generally H-shaped and includes dovetail portions disposed in the slot, a narrow neck portion extending through the top of the slot, and an enlarged portion disposed outside the slot and extending beyond the rotor periphery.

5. The combination according to claim 4, wherein said enlarged portion of the current-carrying wedge member defines a plurality of longitudinally spaced curved passages disposed to facilitate circulation of cooling gas between the air gap and the winding.

6. The combination according to claim 4, wherein said current-carrying wedge dovetail portions are radially spaced and insulated from the slot dovetail portions by load-bearing creepage blocks.

7. In a dynamoelectric machine rotor, having a rotor body defining a plurality of longitudinal, circumferentially-spaced dovetail slots which are shallower along the central part thereof than at the ends having a plurality of series-connected conductors disposed in said slots to provide a winding, the combination of:
   first and second insulated conductor portions forming a part of the winding and disposed in the top of a said slot near either end of the rotor body,
   a plurality of additional insulated conductors disposed in the slot in radially stacked relationship, said conductors underlying the first and second conductor portions at each end of the rotor body, and being bent radially outward between the first and second portions so as to extend longitudinally along the central portion of the rotor body between the first and second portions in said shallower part of the slot, first and second wedge members having dovetail portions cooperating with the slot dovetails and holding the first and second conductor portions respectively and the additional underlying conductors in place near the ends of the rotor body, and a current-carrying wedge member extending along the length of the rotor body and electrically connected at either end thereof to the first and second conductor portions, said current-carrying wedge member having dovetail portions cooperating with the rotor slot dovetails to hold itself and the additional underlying conductors in place and also having a portion extending radially outward beyond the periphery of the rotor body.

References Cited

UNITED STATES PATENTS

| | | | |
|---|---|---|---|
| 1,028,985 | 6/1912 | Behrend | 310—262 |
| 2,446,708 | 8/1948 | Levin | 310—214 |
| 2,702,870 | 2/1955 | Norris | 310—262 X |
| 2,861,203 | 11/1958 | Luneau et al. | 310—214 X |
| 3,132,296 | 5/1964 | Nippes | 322—58 |

MILTON O. HIRSHFIELD, *Primary Examiner.*

WARREN E. RAY, *Assistant Examiner.*